United States Patent [19]
Shimoe et al.

[11] Patent Number: 4,834,416
[45] Date of Patent: May 30, 1989

[54] VEHICLE REAR SUSPENSION

[75] Inventors: Hiroo Shimoe; Toshiro Kondo; Tetsuya Kameshima, all of Hiroshima, Japan

[73] Assignee: Mazda Motor Corporation, Hiroshima, Japan

[21] Appl. No.: 24,078

[22] Filed: Mar. 10, 1987

[30] Foreign Application Priority Data

Mar. 11, 1986 [JP] Japan .................................. 61-53479
Mar. 11, 1986 [JP] Japan .................................. 61-53480

[51] Int. Cl.⁴ ................................................ B60G 7/02
[52] U.S. Cl. ..................................... 280/688; 280/717; 280/725; 267/281; 267/141.2
[58] Field of Search ............... 280/724, 725, 721, 717, 280/673, 688, 701; 267/57.1 R, 279, 57.1 A, 280, 63 A, 281, 140.3, 141.2, 141; 384/221, 222, 536, 582

[56] References Cited

U.S. PATENT DOCUMENTS

| | | | |
|---|---|---|---|
| 4,121,813 | 10/1978 | Inuzuka | 267/281 |
| 4,139,246 | 2/1979 | Mikoshiba et al. | 280/673 |
| 4,513,990 | 4/1985 | Morita et al. | 267/281 |
| 4,537,420 | 8/1985 | Ito et al. | 280/690 |
| 4,621,830 | 11/1986 | Kanai | 280/690 |
| 4,740,012 | 4/1988 | Kondo et al. | 280/725 |

FOREIGN PATENT DOCUMENTS

| | | | |
|---|---|---|---|
| 172999 | 3/1986 | European Pat. Off. | 280/717 |
| 2703038 | 7/1978 | Fed. Rep. of Germany | 267/141.2 |
| 0020505 | 2/1983 | Japan | 280/717 |
| 494811 | 11/1938 | United Kingdom | 267/141.2 |

Primary Examiner—Charles A. Marmor
Assistant Examiner—Karin Tyson
Attorney, Agent, or Firm—Gerald J. Ferguson, Jr.

[57] ABSTRACT

In a rear suspension comprising left and right trailing arms which are pivoted on the vehicle body at the front ends for vertical swinging motion by way of rubber bushings, and a torsion beam connecting the trailing arms, nonlinear toe characteristics of the outer rear wheel are obtained by mounting the trailing arms so that the pivotal axes thereof intersect on the front side of the line joining the rubber bushings on the front ends thereof, and selecting the elastic characteristics of the rubber bushings in the direction perpendicular to the pivotal axis of the corresponding trailing arm in the horizontal plane including the pivotal axis.

11 Claims, 11 Drawing Sheets

F I G. 13A
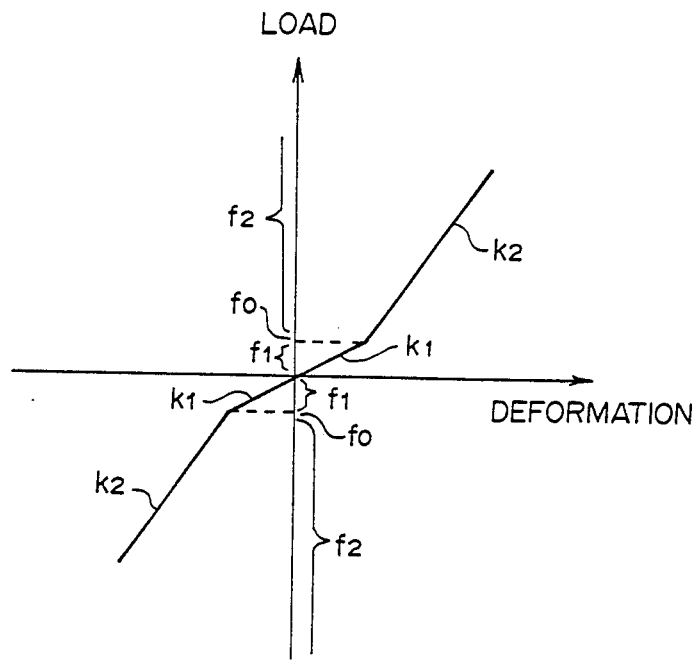
F I G. 13B
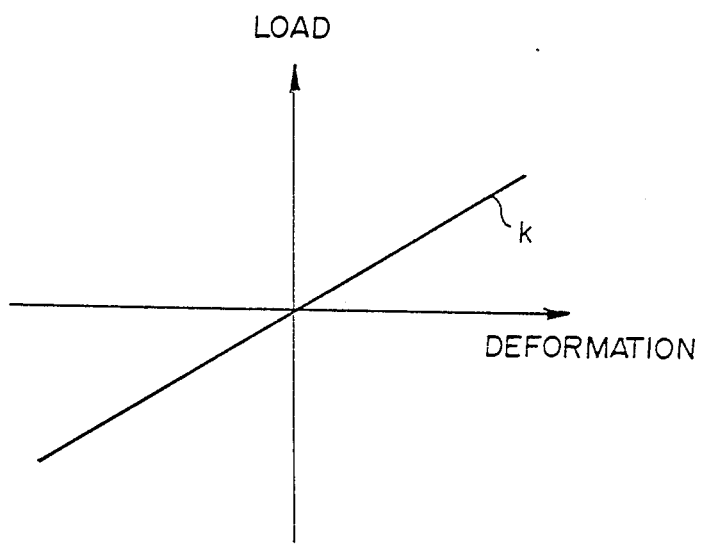

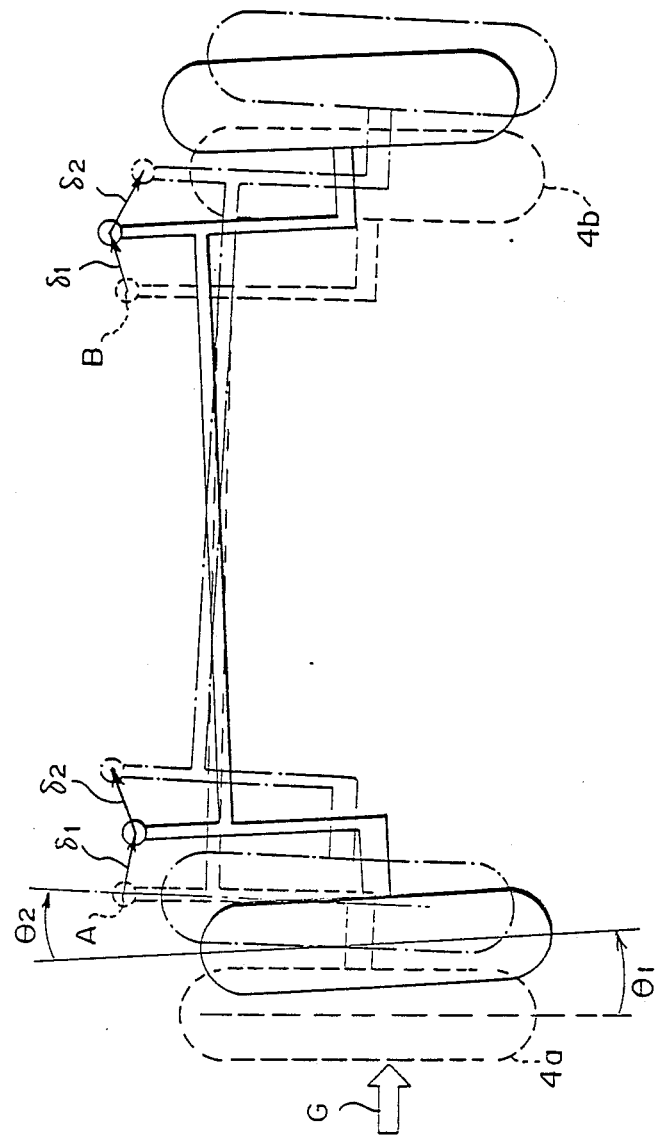

VEHICLE REAR SUSPENSION

BACKGROUND OF THE INVENTION

1. Field of the Invention

This invention relates to a twist-beam type rear suspension for a vehicle.

2. Description of the Prior Art

There has been known a twist-beam type rear suspension as disclosed in, for instance, Japanese Unexamined Utility Model Publication No. 58(1983)-90814. The twist-beam type rear suspension generally comprises left and right trailing arms which are pivoted on the vehicle body at the front ends for vertical swinging motion by way of rubber bushings, and a torsion beam connecting intermediate portions of the trailing arms, and left and right rear wheels are supported on the rear end of the respective trailing arms so that vertical displacement of the rear wheels relative to each other due to bumps and recesses on the road is limited by torsion counterforce of the torsion beam.

It is generally preferred in order to improve running performance of the vehicle that the toe of the rear wheels be controlled in addition to the turning of the front wheels in response to turning of the steering wheel. For example, when the steering wheel is turned by a slight angle while the vehicle is moving straight, it is preferred that the outer (with respect to the turning direction) rear wheel be caused to toe in to generate understeer tendency, thereby improving running stability of the vehicle. On the other hand, during hard cornering, it is preferred that the outer rear wheel be caused to toe out to weaken strong understeer tendency especially in the case of a front-engine front-wheel-drive type vehicle in which understeer tendency is stronger. In another aspect, it is generally preferred that when the steering wheel is turned while the vehicle is moving at a low speed, the outer rear wheel be caused to toe out to improve the heading performance of the vehicle. On the other hand, during hard cornering or lane changing at a high speed, it is preferred that the outer rear wheel be caused to toe in to ensure running stability.

Such behavior of the outer rear wheel can be obtained by controlling the toe of the rear wheel according to the side force generated by change of centripetal acceleration to act on the rear wheel when the steering wheel is turned. However, in the case of the conventional torsion-axle type rear suspension, when side force acts on the rear wheel, the rear wheel is merely caused to toe out. That is, when a side force generated by centripetal acceleration acts on the rear wheels, a force of the same direction as the side force acts on each of the rubber bushings on the front ends of the trailing arms, and at the same time a pair of forces act on the rubber bushings to rearwardly displace the bushing outwardly with respect to the turning direction and to forwardly displace the other bushing, thereby causing solely the outer rear wheel to toe out, since the pivotal axes of the trailing arms are on the front side of the line of action of the side force.

Further, in the rear suspension disclosed in Japanese Unexamined Patent Publication No. 58(1983)-20505, the trailing arms are mounted so that the pivotal axes of the trailing arms are inclined to intersect on the front side of the line joining the rubber bushings on the front ends of the trailing arms, thereby causing the compound elastic center of the bushings, i.e., the rotational instantaneous center, to approach the line of action of the side force acting on the rear wheels. In this rear suspension also, toe of the outer rear wheel cannot be controlled as desired though the degree of toe in or toe out can be limited.

SUMMARY OF THE INVENTION

In view of the foregoing observations and description, a first object of the present invention is to provide a rear suspension in which the outer rear wheel can be caused to toe in when the side force produced by centripetal acceleration to act thereon is relatively weak and caused to toe out when the side force is relatively strong.

A second object of the present invention is to provide a rear suspension in which the outer rear wheel can be caused to toe out when the side force produced by centripetal acceleration to act thereon is relatively weak and caused to toe in when the side force is relatively strong.

The first object of the present invention can be accomplished by a rear suspension comprising left and right trailing arms which are pivoted on the vehicle body at the front ends for vertical swinging motion by way of rubber bushings, and a torsion beam connecting the trailing arms, characterized in that the pivotal axes of the trailing arms are inclined to intersect on the front side of the line joining the rubber bushings on the front ends thereof, and each of the rubber bushings has such elastic characteristics as to be hard in the direction perpendicular to the pivotal axis of the corresponding trailing arm in the horizontal plane including the pivotal axis in a small displacement range and to be soft in the same direction in a large displacement range.

With this arrangement, the direction of the resultant of a force acting on each of the rubber bushings in the direction of the pivotal axis of the corresponding trailing arm when a side force generated by centripetal acceleration acts on the rear wheels and a force perpendicular thereto can be set to a predetermined direction, and the direction of deformation of the rubber bushing for the direction of the resultant of the forces is changed with change in the side force so that the outer rear wheel is caused to toe in when the side force acting on the rear wheels is relatively weak and to toe out when the side force is relatively strong.

The second object of the present invention can be accomplished by a rear suspension comprising left and right trailing arms which are pivoted on the vehicle body at the front ends for vertical swinging motion by way of rubber bushings, and a torsion beam connecting the trailing arms, characterized in that the pivotal axes of the trailing arms are inclined to intersect on the front side of the line joining the rubber bushings on the front ends thereof, and each of the rubber bushings has such elastic characteristics as to be soft in the direction perpendicular to the pivotal axis of the corresponding trailing arm in the horizontal plane including the pivotal axis in a small displacement range and to be hard in the same direction in a large displacement range.

With this arrangement, the direction of the resultant of a force acting on each of the rubber bushings in the direction of the pivotal axis of the corresponding trailing arm when a side force generated by centripetal acceleration acts on the rear wheels and a force perpendicular thereto can be set to a predetermined direction, and the direction of deformation of the rubber bushing for the direction of the resultant of the forces is changed with change in the side force so that the outer rear wheel is caused to toe out when the side force acting on the rear wheels is relatively weak and to toe in when the side force is relatively strong.

The line joining the rubber bushings is, more strictly, the line joining the centers of the rubber bushings, the center of each rubber bushings being a point at the middle of the rubber bushing as seen in the direction of width thereof and on the pivotal axis of the corresponding trailing arm.

The inclination of each trailing arm is not limited to a particular angle but is determined according to the elastic characteristics of the rubber bushings, and depending on selection of the inclination of the trailing arms and the elastic characteristics of the rubber bushings, various toe characteristics can be obtained.

BRIEF DESCRIPTION OF THE DRAWINGS

FIGS. 13A and 13B are graphs showing the elastic characteristics of the rubber bushing employed in the second embodiment, FIGS. 14 to 19 are schematic plan views for illustrating the operation of the second embodiment.

DESCRIPTION OF THE PREFERRED EMBODIMENTS

Figure 1:
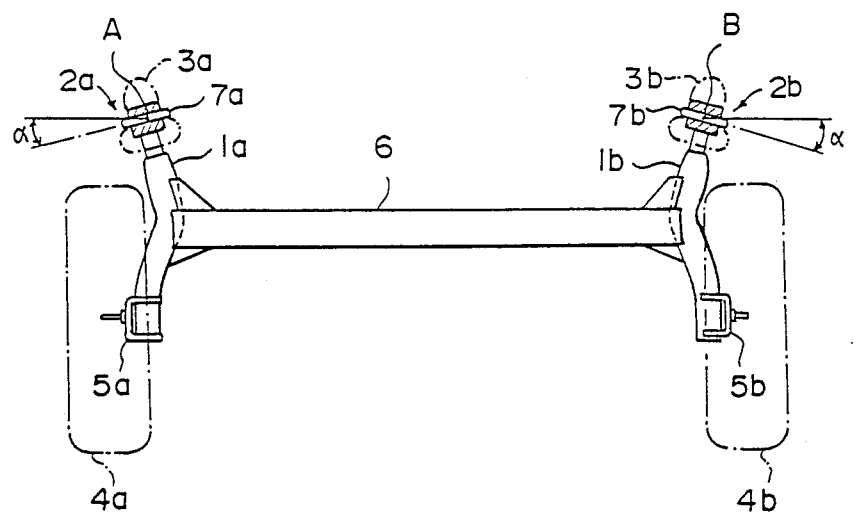
FIG. 1 is a plan view showing a rear suspension in accordance with a first embodiment of the present invention.

In FIG. 1, left and right trailing arms $1a$ and $1b$ are respectively pivoted at the front ends for vertical swinging motion by way of rubber bushings $2a$ and $2b$ on mounting brackets $3a$ and $3b$ fixed to the vehicle body, and are connected at the rear ends to wheel supports $5a$ and $5b$ for rotatably supporting left and right wheels $4a$ and $4b$. A torsion beam 6 extending in the transverse direction of the vehicle body is connected to intermediate portions of the trailing arms $1a$ and $1b$. The trailing arms $1a$ and $1b$ are respectively swingable about pivotal axes $7a$ and $7b$ which are inclined by a predetermined angle $\alpha$ to intersect on the front side of the line joining the centers A and B of the rubber bushings $2a$ and $2b$, the center of each rubber bushings being a point at the middle of the rubber bushing as seen in the direction of width thereof and on the pivotal axis of the corresponding trailing arm.

Figure 2:
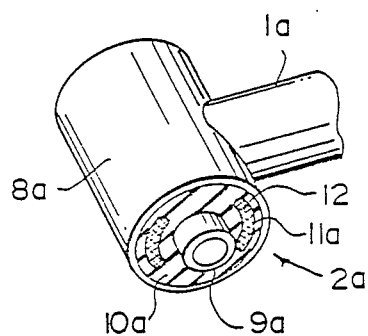
FIG. 2 is an enlarged perspective view of the rubber bushing employed in the rear suspension of the first embodiment.
Figure 3A:
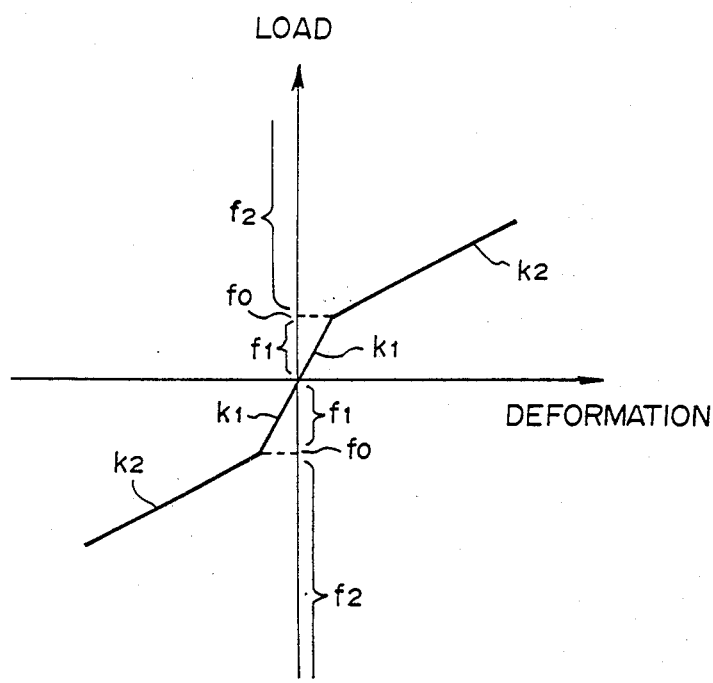
FIGS. 3A and 3B are graphs showing the elastic characteristics of the rubber bushing employed in the first embodiment.
Figure 3B:
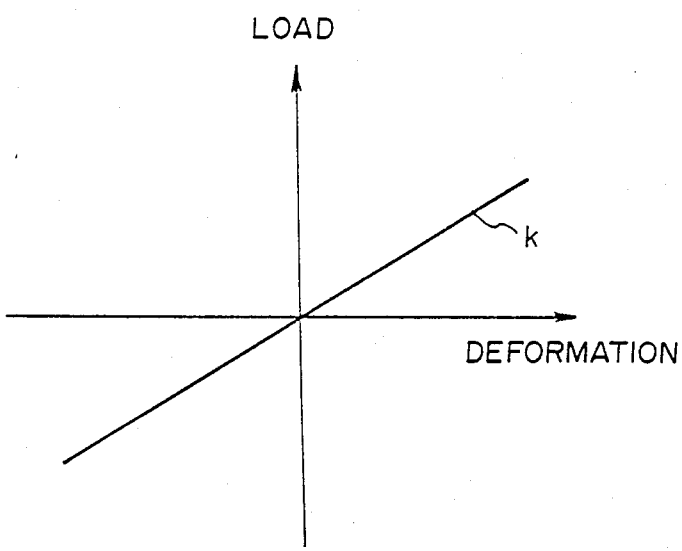

As shown in FIG. 2, the rubber bushing $2a$ comprises a rubber body $10a$ filled into the space between an outer tubular member $8a$ integrally formed on the front end of the trailing arm $1a$ and an inner tubular member $9a$ fixed to the mounting bracket $3a$ to extend in the direction of the pivotal axis $7a$ of the trailing arm $1a$. The rubber body $10a$ is provided with a pair of arcuate through holes $11a$ extending through the rubber body $10a$ on the front and rear side of the inner tubular member $9a$ in parallel to the central axis thereof. A resin plate 12 is press-fitted into each of the through holes $11a$, and by virtue of the resin plate 12, the relation between the load acting on the rubber bushing $2a$ in the direction perpendicular to the pivotal axis $7a$ in the horizontal plane including the pivotal axis $7a$ and the deformation of the rubber bushing $2a$ changes at a preset load $f_o$ as shown in FIG. 3A. That is, the rubber bushing $2a$ is hard (spring constant of k1) in the small displacement range and soft (spring constant of k2) in the large displacement range. The relation between the load acting on the rubber bushing $2a$ in the axial direction and the deformation of the rubber bushing $2a$ is linear (spring constant of k) through the small displacement range and the large displacement range as shown in FIG. 3B. The other rubber bushing $2b$ is of identical structure.

Figure 4:
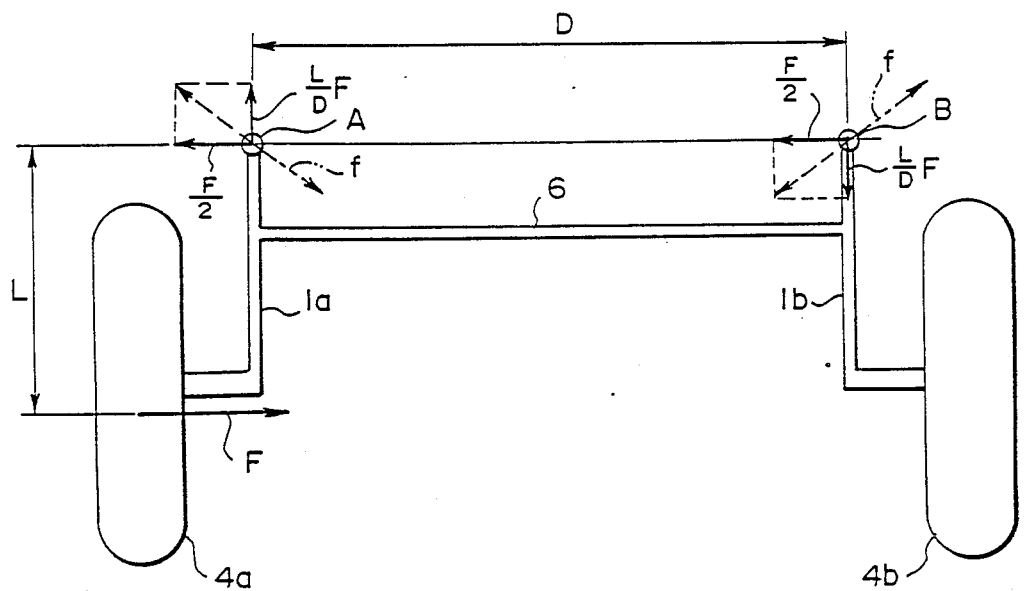
FIGS. 4 to 9 are schematic plan views for illustrating the operation of the first embodiment.

FIG. 4 is a plan view showing balances of forces at the centers A and B of the rubber bushings $2a$ and $2b$ when a side force F generated by a centripetal acceleration acts on the rear wheel $4a$. At the respective centers A and B, counterforces as shown in FIG. 4 are produced in a direction parallel to the line of action of the side force F and in a direction perpendicular thereto. That is, a force f equal in magnitude to the resultant force of the counterforces and directed in the opposite direction acts on each of the rubber bushings $2a$ and $2b$.

Figure 5:
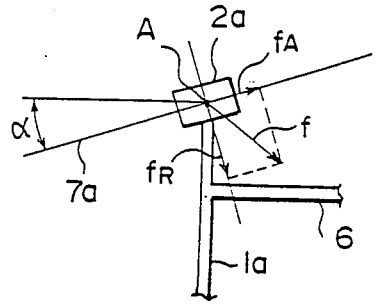

FIG. 5 shows the force f acting on the center A as divided into a component fA in the direction of the pivotal axis $7a$ and a component fR in the direction perpendicular to the pivotal axis $7a$ in the horizontal plane including the pivotal axis $7a$. Deformations $\delta A$ and $\delta R$ of the rubber bushing $2a$ in the corresponding direction generated by the components fA and fR can be represented as follows since the elastic characteristics of the rubber bushing $2a$ in the relevant directions are as shown in FIGS. 3A and 3B. That is, $\delta A = fA/k$, $\delta R1$ (deformation in the small displacement range) $= fR/k1$, $\delta R2$ (deformation in the large displacement range) $= fR/k2$.

Figure 6:
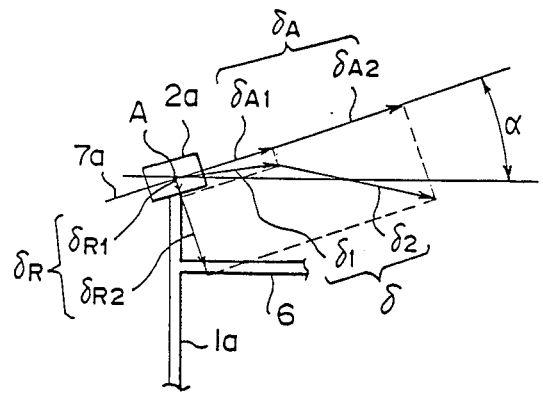

FIG. 6 shows the change in deformation of the rubber bushing $2a$ with increase in the centripetal acceleration.

As described above, the deformation of the rubber bushing $2a$ in the direction of the pivotal axis $7a$ increases in proportion to increase in the component fA and the deformation of the rubber bushing $2a$ in the direction perpendicular to the pivotal axis $7a$ increases nonlinearly with increase in the component fR. Accordingly, the direction of the deformation 6 obtained by combining the deformations $\delta A$ and $\delta R$ is directed forward in the small displacement range ($\delta 1$) and rearward in the large displacement range ($\delta 2$) as can be understood from FIG. 6.

Figure 7:
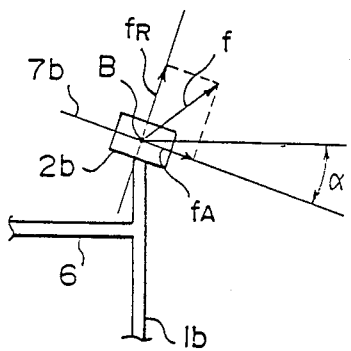
Figure 8:
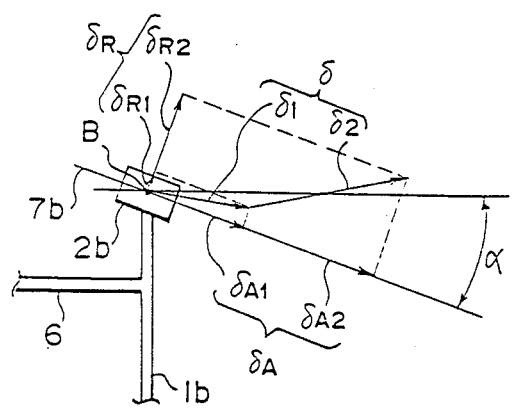

FIGS. 7 and 8 are views similar to FIGS. 5 and 6 but showing the force f acting on the centers B and the deformation 6 of the rubber bushing $2b$. As can be understood from FIGS. 7 and 8 in comparison with FIGS. 5 and 6, the deformation of the rubber bushing $2b$ is directed rearward in the small displacement range ($\delta 1$) and forward in the large displacement range ($\delta 2$) since the inclination of the pivotal axis $7b$ is opposite to the inclination of the pivotal axis $7a$ and the direction of the force f acting on the center B is opposite to the direction of the force f acting on the center A.

Figure 9:
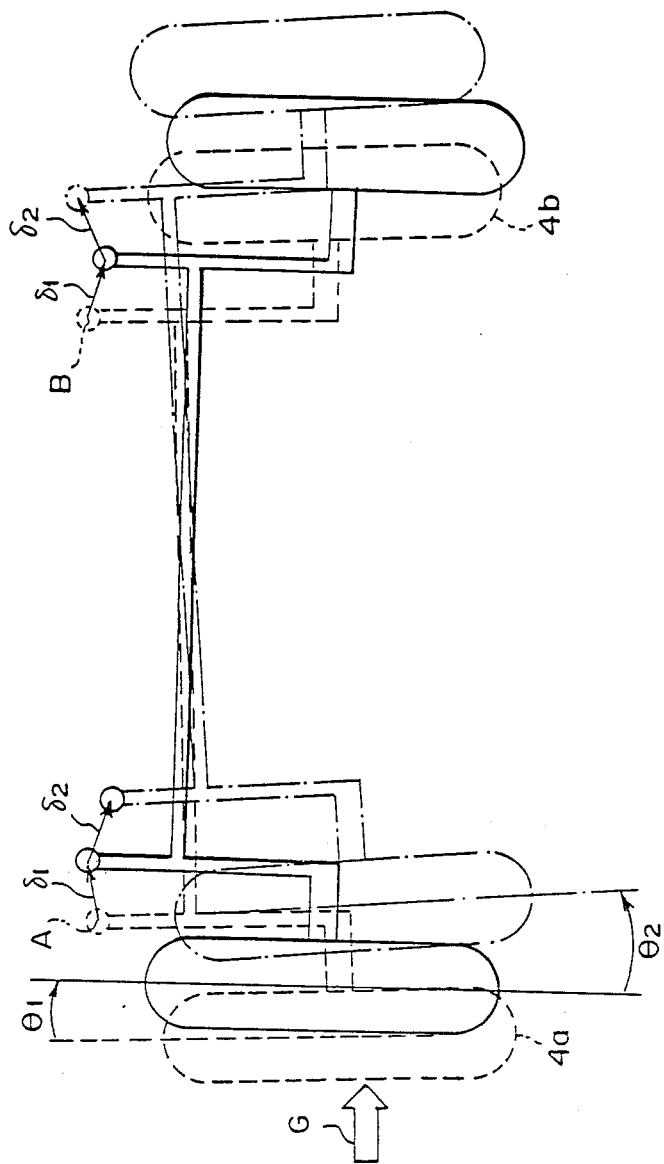

FIG. 9 shows toe change of the rear wheels 4a and 4b due to displacement of the centers A and B generated by deformation of the rubber bushings 2a and 2b when side force G acts on the rear wheels 4a and 4b.

When the side force G is relatively weak and the deformation of the rubber bushing 2a is small, the center A of the rubber bushing 2a is displaced in the direction of δ1 and the outer rear wheel 4a is caused to toe in (θ1). On the other hand, when the side force G is increased and the deformation of the rubber bushing 2a is increased, the center A is displaced in the direction of δ2 and the outer rear wheel 4a is caused to toe out (θ2).

Figure 10:
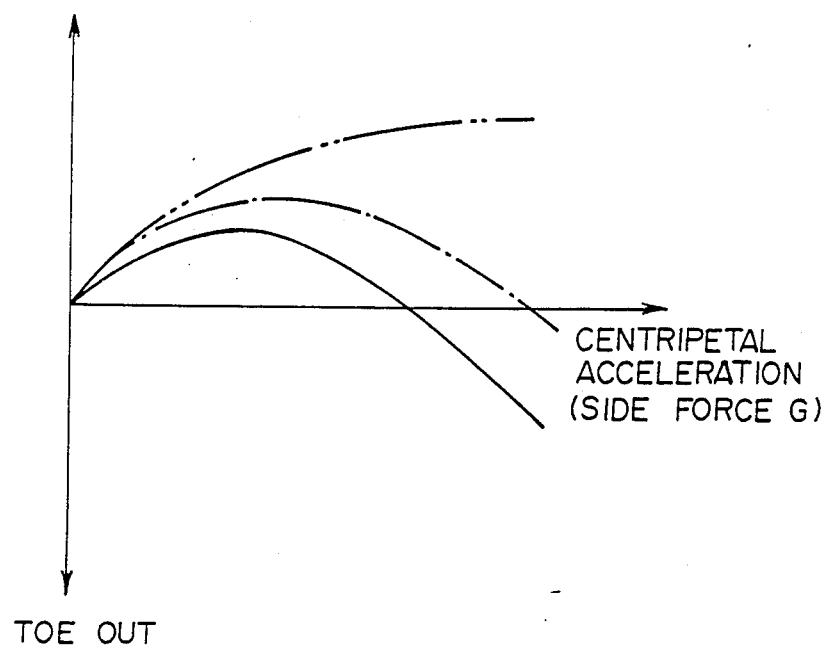
FIG. 10 is a graph for illustrating the toe characteristics obtained by the first embodiment.

FIG. 10 shows the toe characteristics of the outer rear wheel 4a with respect to the centripetal acceleration or the side force G.

As shown by the solid line, when a relatively weak side force acts on the outer rear wheel 4a due to a small centripetal acceleration generated, for instance, when the steering wheel is turned by a small angle during a straight travel, the outer rear wheel 4a is caused to toe in, and when a relatively strong side force acts on the outer rear wheel 4a due to a large centripetal acceleration generated, for instance, during a hard cornering, the outer rear wheel 4a is caused to toe out. As described above, this effect is obtained by virtue of the elastic characteristics of the rubber bushings 2a and 2b, and the inclination of the pivotal axes 7a and 7b of the trailing arms 1a and 1b. By changing the selection of these items, various toe characteristics of the outer rear wheel can be obtained as shown by the chained lines in FIG. 10.

Now a second embodiment of the present invention will be described hereinbelow with reference to FIGS. 11 to 20.

In FIGS. 11 to 20, the parts analogous to the parts shown in FIGS. 1 to 10 are given the same reference numerals and the difference between the first embodiment and the second embodiment will be mainly described, hereinbelow. In this embodiment, the rubber bushing 2a on the front end of the trailing arm 1a differs from the rubber bushing 2a in the elastic characteristics. That is, the rubber bushing 2a' is provided with no resin plate in the through holes 11a' in the rubber body 10a'. By virtue of the through holes 11a', the relation between the load acting on the rubber bushing 2a' in the direction perpendicular to the pivotal axis 7a in the horizontal plane including the pivotal axis 7a and the deformation of the rubber bushing 2a' changes at a preset load $f_o$ as shown in FIG. 13A. That is, the rubber bushing 2a' is soft (spring constant of k1) in the small displacement range and hard (spring constant of k2) in the large displacement range. The relation between the load acting on the rubber bushing 2a' in the axial direction and the deformation of the rubber bushing 2a' is linear (spring constant of k) through the small displacement range and the large displacement range as shown in FIG. 13B. The other rubber bushing 2b' is of the identical structure.

Figure 14:
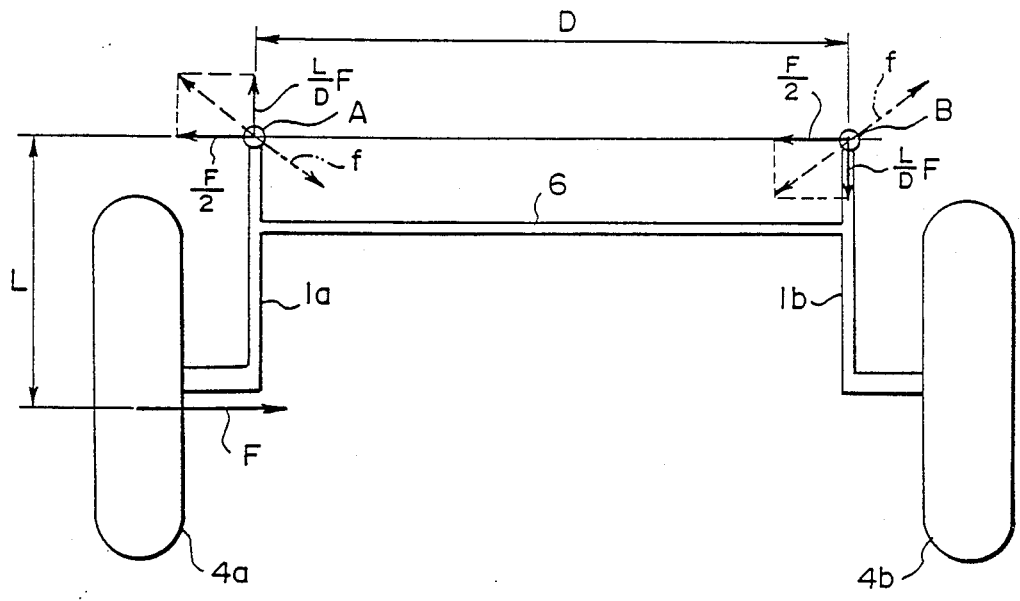

FIG. 14 is a plan view showing balances of forces at the centers A and B of the rubber bushings 2a' and 2b' when a side force F generated by a centripetal acceleration acts on the rear wheel 4a. At the respective centers A and B, counterforces as shown in FIG. 14 are produced in a direction parallel to the line of action of the side force F and in a direction perpendicular thereto. That is, a force f equal in magnitude to the resultant force of the counterforces and directed in the opposite direction acts on each of the rubber bushings 2a' and 2b'.

Figure 15:
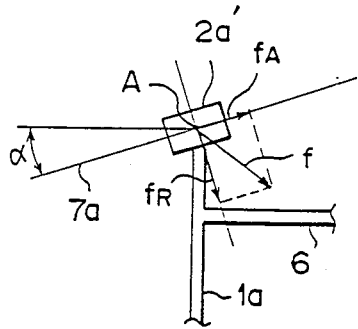

FIG. 15 shows the force f acting on the center A as divided into a component fA in the direction of the pivotal axis 7a and a component fR in the direction perpendicular to the pivotal axis 7a in the horizontal plane including the pivotal axis 7a. Deformations A and R of the rubber bushing 2a' in the corresponding direction generated by the components fA and fR can be represented as follows since the elastic characteristics of the rubber bushing 2a' in the relevant directions are as shown in FIGS. 13A and 13B. That is, $\delta A = fA/k$, $\delta R1$ (deformation in the small displacement range) $= fR/k1$, $\delta R2$ (deformation in the large displacement range) $= fR/k2$.

Figure 16:
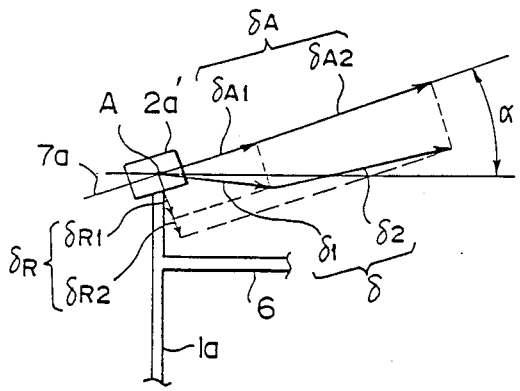

FIG. 16 shows the change in deformation of the rubber bushing 2a' with increase in the centripetal acceleration.

As described above, the deformation of the rubber bushing 2a' in the direction of the pivotal axis 7a increases in proportion to increase in the component fA and the deformation of the rubber bushing 2a' in the direction perpendicular to the pivotal axis 7a increases nonlinearly with increase in the component fR. Accordingly, the direction of the deformation δ obtained by combining the deformations δA and δR is directed rearward in the small displacement range (δ1) and forward in the large displacement range (δ2) as can be understood from FIG. 16.

Figure 17:
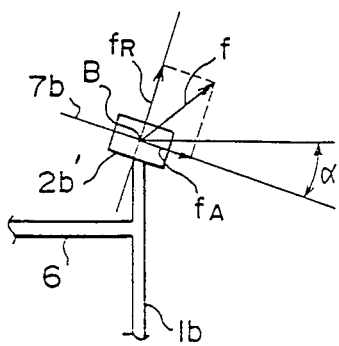
Figure 18:
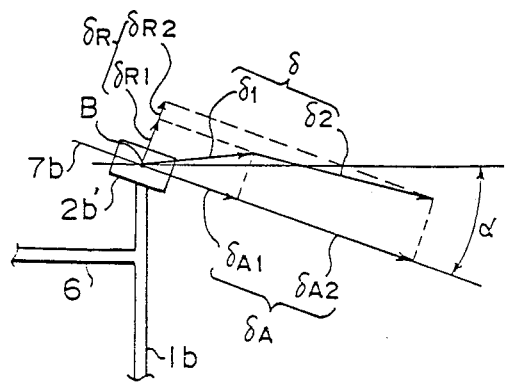

FIGS. 17 and 18 are views similar to FIGS. 15 and 16 but showing the force f acting on the centers B and the deformation δ of the rubber bushing 2b. As can be understood from FIGS. 17 and 18 in comparison with FIGS. 15 and 16, the deformation of the rubber bushing 2b is directed forward in the small displacement range (δ1) and rearward in the large displacement range (δ2) since the inclination of the pivotal axis 7b is opposite to the inclination of the pivotal axis 7a and the direction of the force f acting on the center B is opposite to the direction of the force f acting on the center A.

FIG. 19 shows toe change of the rear wheels 4a and 4b due to displacement of the centers A and B generated by deformation of the rubber bushings 2a' and 2b' when side force G acts on the rear wheels 4a and 4b.

When the side force G is relatively weak and the deformation of the rubber bushing 2a' is small, the center A of the rubber bushing 2a' is displaced in the direction of δ1 and the outer rear wheel 4a is caused to toe out (θ1). On the other hand, when the side force G is increased and the deformation of the rubber bushing 2a' is increased, the center A is displaced in the direction of δ2 and the outer rear wheel 4a is caused to toe in (θ2).

Figure 20:
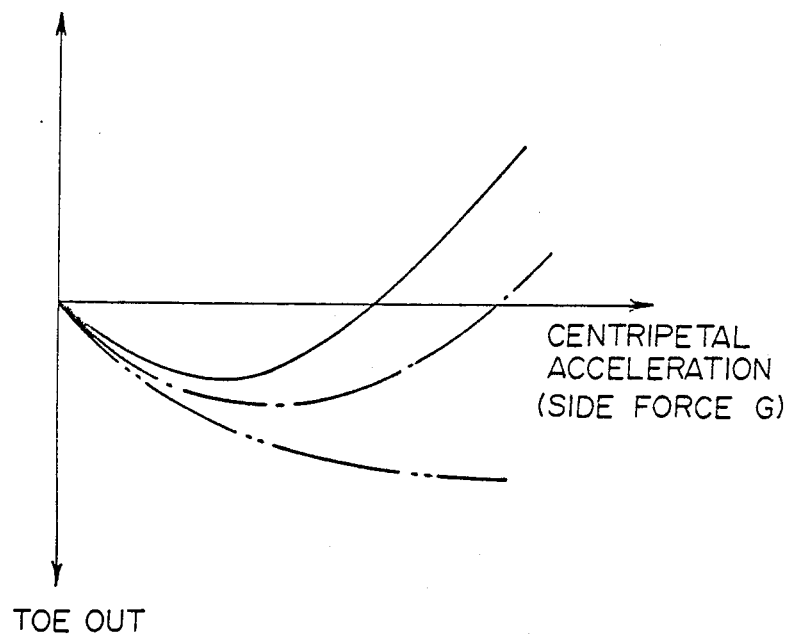
FIG. 20 is a graph for illustrating the toe characteristics obtained by the second embodiment.
Figure 11:
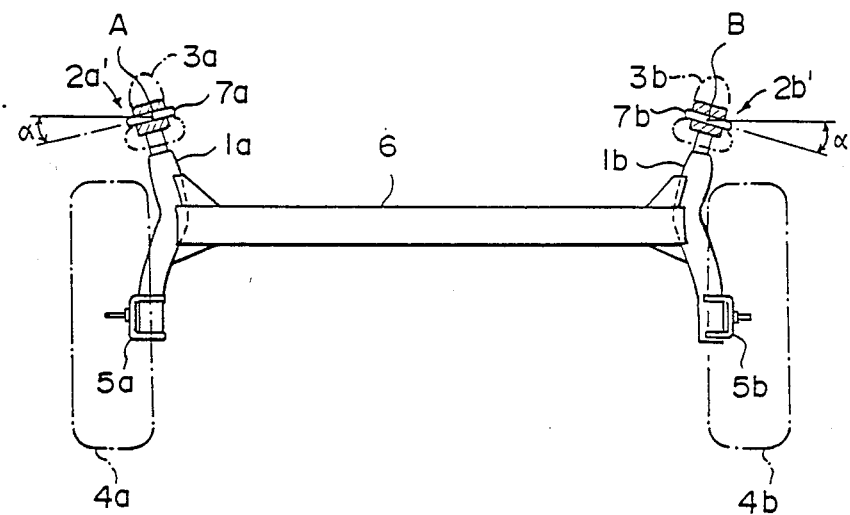
FIG. 11 is a plan view showing a rear suspension in accordance with a second embodiment of the present invention.
Figure 12:
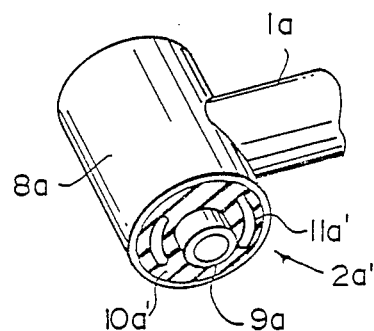
FIG. 12 is an enlarged perspective view of the rubber bushing employed in the rear suspension of the second embodiment.

FIG. 20 shows the toe characteristics of the outer rear wheel 4a with respect to the centripetal acceleration or the side force G.

As shown by the solid line, when a relatively weak side force acts on the outer rear wheel 4a due to a small centripetal acceleration generated, for instance, during cornering at a low to middle speed, the outer rear wheel 4a is caused to toe out, and when a relatively strong side force acts on the outer rear wheel 4a due to a large centripetal acceleration generated, for instance, during lane change at a high speed, the outer rear wheel 4a is caused to toe in. As described above, this effect is obtained by virtue of the elastic characteristics of the rubber bushings 2a' and 2b', and the inclination of the pivotal axes 7a and 7b of the trailing arms 1a and 1b. By changing the selection of these items, various toe characteristics of the outer rear wheel can be obtained as shown by the chained lines in FIG. 20.

We claim:

1. A rear suspension comprising left and right trailing arms which are pivoted on the vehicle body at the front ends for vertical swinging motion by way of rubber bushings, and a torsion beam connecting the trailing arms, characterized in that the pivotal axes of the trailing arms are inclined in the horizontal plane so as to intersect forwardly of a line joining the rubber bushings, and each of the rubber bushings has such elastic characteristics as to be hard in the direction perpendicular to the pivotal axis of the corresponding trailing arm in the horizontal plane including the pivotal axis in a small displacement range and to be soft in the same direction in a large displacement range.

2. A rear suspension as defined in claim 1 in which each of said rubber bushings comprises an inner tubular member fixedly connected to the vehicle body, an outer tubular member which is fixed to the front end of the trailing arm and in which the inner tubular member is received, and a rubber body inserted between the inner and outer tubular members.

3. A rear suspension as defined in claim 1 in which said rubber bushing is provided with a hole and a spacer is press-fitted into the hole.

4. A rear suspension as defined in claim 1 in which said torsion beam connects substantially the middle points of the trailing arms.

5. A rear suspension comprising left and right trailing arms which are pivoted on the vehicle body at the front ends for vertical swinging motion by way of rubber bushings, and a torsion beam connecting the trailing arms, characterized in that the pivotal axes of the trailing arms are inclined in the horizontal plane so as to intersect forwardly of a line joining the rubber bushings, and each of the rubber bushings has such elastic characteristics as to be hard in the direction perpendicular to the pivotal axis of the corresponding trailing arm in the horizontal plane including the pivotal axis in a small displacement range and to be soft in the same direction in a large displacement range such that, in response to the vehicle body being turned, the toe characteristic of the outer rear wheel with respect to a resultant side force on the rear wheels is changed toward a toe-in direction in response to an increase of the side force on the rear wheels when the side force is weak and a toe-out direction in response to an increase of the side force when the side force is strong.

6. A rear suspension comprising left and right trailing arms which are pivoted on the vehicle body at the front ends for vertical swinging motion by way of rubber bushings, and a torsion beam connecting the trailing arms, comprising tow control means respectively disposed at said front ends of the trailing arms for controlling the outer rear wheel with respect to a resultant side force on the rear wheel such that, in response to the vehicle body being turned, the toe characteristic of the outer rear wheel is changed toward a toe-out direction in response to an increase of the side force on the rear wheels when the side force is weak and a toe-in direction in response to a increase of the side force when the side force is strong and where the pivotal axes of the trailing arms are inclined in the horizontal plane so as to intersect forwardly on a line joining the rubber bushings, and where said toe control means comprises the rubber bushings where each bushing has such elastic characteristics as to be soft in the direction perpendicular to the pivotal axis of the corresponding trailing arm in the horizontal plane including the pivotal axis in a small displacement range and to be hard in the same direction in a large displacement range where the inclination of the pivotal axes of the trailing arms and the elastic characteristics of the bushings are such that the bushing associated with the outer rear wheel will be deformed in a direction rearward of said line joining the rubber bushings in said small displacement range and in a direction forward of said line joining the rubber bushings in said large displacement range.

7. A rear suspension comprising left and right trailing arms which are pivoted on the vehicle body at the front ends for vertical swinging motion by way of rubber bushings, and a torsion beam connecting the trailing arms, characterized in that the pivotal axes of the trailing arms are inclined in the horizontal plane so as to intersect forwardly of a line joining the rubber bushings, and each of the rubber bushings has such elastic characteristics as to be hard in the direction perpendicular to the pivotal axis of the corresponding trailing arm in the horizontal plane including the pivotal axis in a small displacement range and to be soft in the same direction in a large displacement range such that, in response to the vehicle body being turned, the toe characteristic of the outer rear wheel with respect to a resultant side force being exerted on the rear wheels is defined by a curve in which the rate of increase of toe-in with respect to the increasing side force decreases as the side force increases.

8. A rear suspension comprising left and right trailing arms which are pivoted on the vehicle body at the front ends for vertical swinging motion by way of rubber bushings, and a torsion beam connecting the trailing arms, comprising toe control means respectively disposed at said front ends of the trailing arms for controlling the resultant side force such that, in response to the vehicle body being turned, the toe characteristic of the outer rear wheel is defined by a curve in which the rate of increase of toe-out with respect to increasing side force decreases as the side force increases and where the pivotal axes of the trailing arms are inclined in the horizontal plane so as to intersect forwardly on a line joining the rubber bushings, and where said toe control means comprises the rubber bushings where each bushing has such elastic characteristics as to be soft in the direction perpendicular to the pivotal axis of the corresponding trailing arm in the horizontal plane including the pivotal axis in a small displacement range and to be heard in the same direction in a large displacement range where the inclination of the pivotal axes of the trailing arms and the elastic characteristics of the bushings are such that the bushing associated with the outer rear wheel will be deformed in a direction rearward of said line joining the rubber bushings in said small displacement range and in a direction forward of said line joining the rubber bushings in said large displacement range.

9. A rear suspension as defined in claim 8 in which each of said rubber bushings comprises an inner tubular member fixedly connected to the vehicle body, an outer tubular member which is fixed to the front end of the trailing arm and in which the inner tubular member is received, and a rubber body inserted between the inner and outer tubular members.

10. A rear suspension as defined in claim 8 in which said rubber bushing is provided with a hole.

11. A rear suspension as defined in claim 8 in which said torsion beam connects substantially the middle points of the trailing arms.

* * * * *